United States Patent

[11] 3,543,804

| [72] | Inventor | George E. Ziegler<br>Evanston, Illinois |
|---|---|---|
| [21] | Appl. No. | 742,642 |
| [22] | Filed | July 5, 1968<br>Division of Ser. No. 487,004, Sept. 13,<br>1965, now Patent No. 3,418,399. |
| [45] | Patented | Dec. 1, 1970 |
| [73] | Assignee | Thermal Conduits, Inc.<br>Kirkland, Washington<br>a corporation of Washington |

[54] INSULATING STRUCTURE FOR UNDERGROUND PIPES
6 Claims, 7 Drawing Figs.

[52] U.S. Cl. .................................................. 138/105,
138/177
[51] Int. Cl. ..................................................... F16l 1/00;
E02d 29/10
[50] Field of Search ........................................... 138/105,
106, 111, 145, 148, 177; 98/1, 50;
48/127(UOX)(Foreign)

[56] References Cited
UNITED STATES PATENTS

| 670,074 | 3/1901 | Heilman ..................... | 98/50X |
| 1,783,178 | 12/1930 | Makowski ................... | 138/105X |
| 2,464,363 | 3/1949 | Wyatt .......................... | 138/111 |
| 2,663,323 | 12/1953 | Thomas ....................... | 138/105 |
| 2,791,168 | 5/1957 | Mauch ......................... | 98/1 |
| 3,045,707 | 7/1962 | Loper .......................... | 138/111X |
| 3,151,633 | 10/1964 | Shuman ....................... | 138/177 |
| 3,206,867 | 9/1965 | Ziegler ........................ | 138/106X |

FOREIGN PATENTS

| 497,016 | 8/1954 | Italy ............................ | 138/105 |

Primary Examiner—Herbert F. Ross
Attorney—Hill, Sherman, Meroni, Gross & Simpson

ABSTRACT: Insulated pipe installations including a monolithic thermal insulating embedment separated from one or more pipes by void spaces and having at least one chamfered corner, a duct forming element abutting the chamfered corner and providing a longitudinally extending vent for the passage of moisture vapor therealong.

Patented Dec. 1, 1970 3,543,804
Sheet 1 of 2
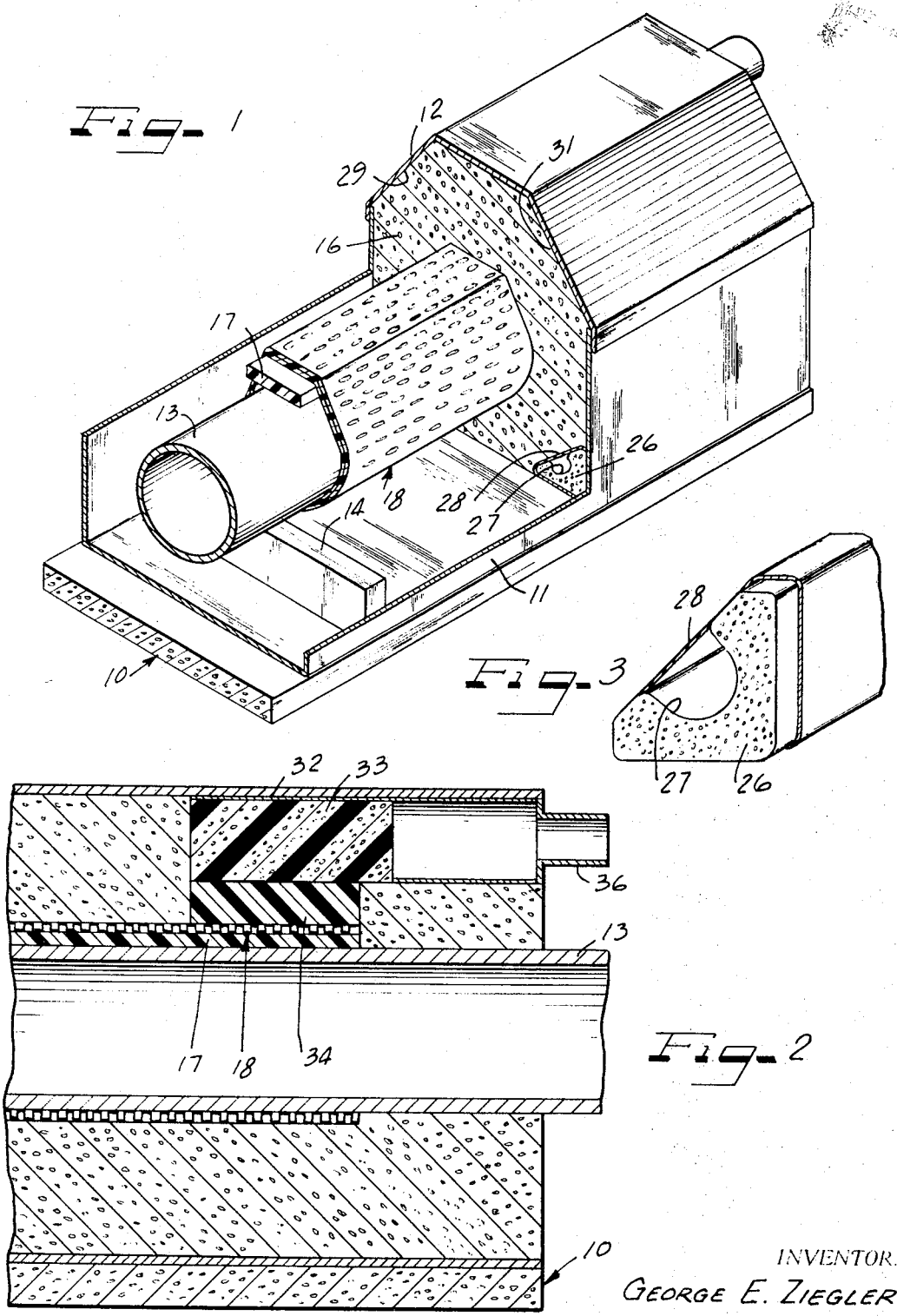
INVENTOR.
GEORGE E. ZIEGLER

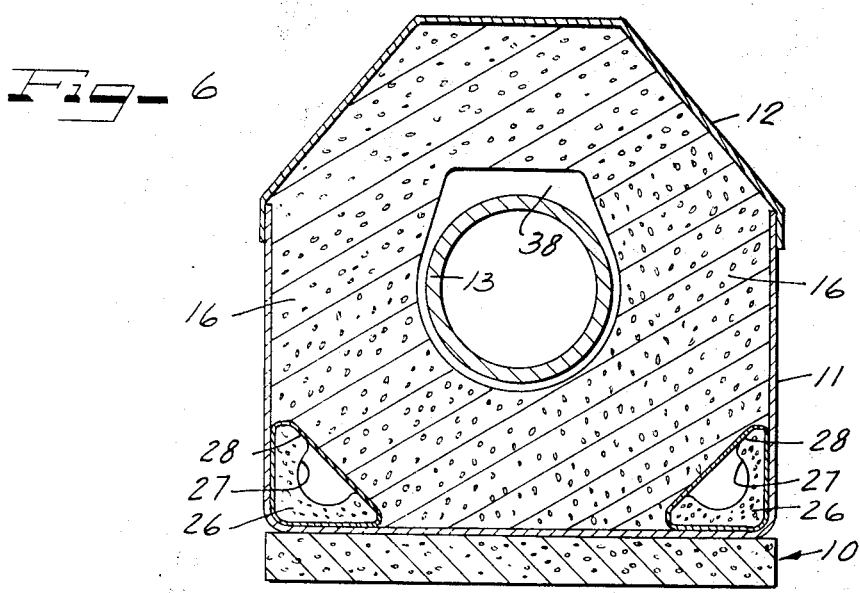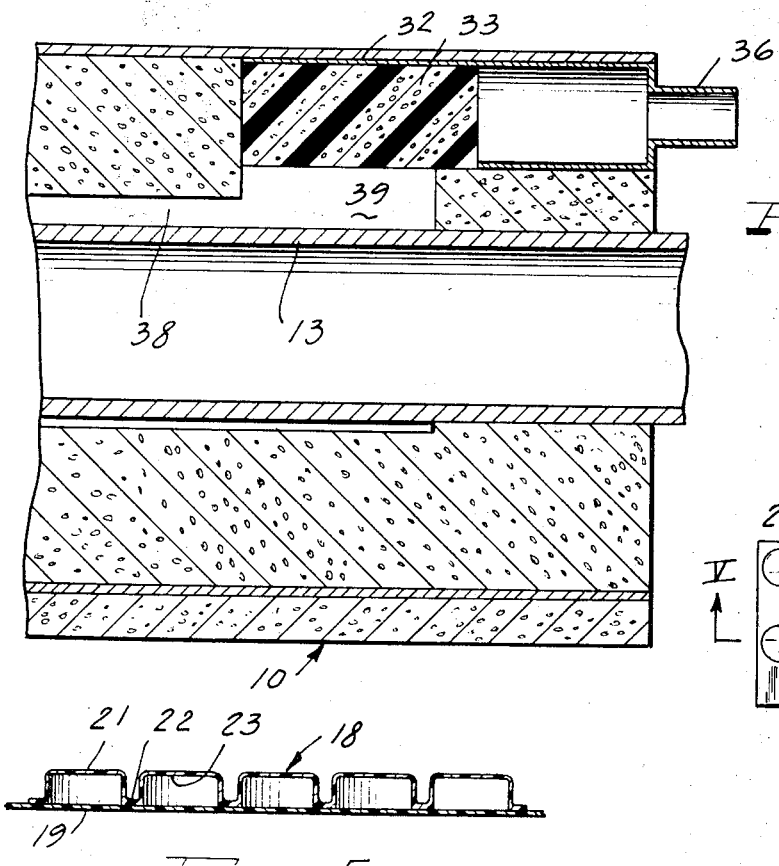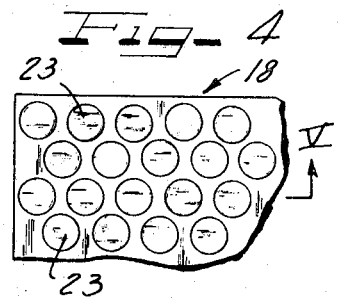

INSULATING STRUCTURE FOR UNDERGROUND PIPES

CROSS REFERENCE TO RELATED APPLICATION

This application is a division of my copending application Ser. No. 487,004 filed Sept. 13, 1965, now U.S. Pat. No. 3,418,399 issued Dec. 24, 1968.

BACKGROUND OF THE INVENTION

1. Field of the Invention

This invention is in the field of insulated underground pipe structures arranged to carry heated fluids, with an air plenum chamber being provided about the pipe and being provided with efficient preformed vent structures.

2. Description of the Prior Art

One particularly suitable type of insulation for underground pipe systems involves the use of a relatively lightweight embedment of the type described in Goff U.S. Pat. No. 2,355,966. While installations embodying the Goff type system had numerous advantages over other types of pipe embedment, such systems had the disadvantage of being rather permeable to moisture with the result that their insulating value decreases significantly whenever substantial amounts of moisture exist. Moisture vapor and liquid water may be present in insulating systems from various causes. Underground pipe installations may be damaged by improper backfill materials, or procedures, or by subsequent operations in the vicinity which cause a break in the waterproof casing materials which are commonly provided about the periphery of the pipe. In addition, if rupture of the pipe should occur due to improper welding or faulty pipe, the fluid from the pipe is likely to seep into the concrete casing.

Additionally, if the insulation is a hydraulically set concrete, a substantial excess of water is normally present in the concrete composition during its period of initial set. Unless the large excess of water is somehow removed, it remains to impair the insulation value of the concrete.

To overcome these difficulties, it has previously been suggested that the lightweight embedment be provided with vent passages within the body of the embedment extending in generally parallel relationship to the embedded pipe. The thermal gradient existing between the hot surface of the pipe and the cold surface of the embedment is sufficient to drive moisture vapor into the vent where it is carried off due to thermal siphoning, or by employing a positive displacement means such as a blower. Systems of this type are described in Lincoln L. Loper, Jr. U.S. Pat. No. 3,045,707, and in my previous U.S. Pat. No. 3,045,708.

The addition of the vent passages substantially overcomes the moisture penetration problem under normal operating circumstances. The vents alone, however, are incapable of restoring the system to operating condition within a short time when the insulation is completely flooded, as may occur from a break in the pipe or from the flooding of a manhole. Some contractors require that any underground pipe insulation system should be in normal thermal efficiency operation 48 hours after the water has been drained. They further specify that the system in its operating condition must have a moisture content less than 5 percent. The rapid removal of such large amounts of water from the insulation therefore poses a significant problem.

In my previous U.S. Pat. No. 3,206,867, there is provided an embedment of relatively porous, insulating concrete having at least one vent passage extending in parallel spaced relation adjacent the pipe. Air under pressure was passed radially outwardly from the outer periphery of the pipe while a heated fluid was passed through the pipe. The thus heated air was passed through the insulation at a mass velocity sufficient to force the moisture contained in the embedment into the vent passage for elimination from the system. The system provided a plenum chamber about the periphery of the pipe into which air, at a controlled velocity, was introduced. The plenum chamber was formed by initially covering a substantial length of the pipe with a parting medium such as a corrugated paper treated with asphalt or the like. When steam was passed through the pipe, the asphalt was melted, and the paper charred, disintegrated, or at least was rendered porous to air flow.

The present invention provides an insulated pipe assembly in which there is a plenum chamber about the periphery of the pipe and in which preformed vent structures are used preferably at the corners of the monolithic embedment to provide a more efficient flow of air, with the result that the number of vent passages in the embedment can be reduced.

In addition to use with a thermally insulating concrete composition, the present invention is applicable to insulating compositions which are not hydraulically set. For example, in place of the concrete embedment, one may use a compacted mass of lightweight aggregate coated with a thermoplastic binder, as described in Goff U.S. Pat. No. 2,901,775. Alternatively, the invention may also be employed with a high temperature foamed plastic material such as polyurethane.

SUMMARY OF THE INVENTION

The present invention involves an improved insulated pipe assembly which makes it possible to secure efficient drying with fewer vent passages, and reduces the amount of insulating concrete required. The improved insulated pipe structure provides a monolithic thermal insulating embedment about the pipe with a void space therebetween, the embedment having at least one chamfered corner.

The void space which I have identified as a plenum chamber surrounding the pipe is provided at the outlet ends with a structure to prevent a chimney effect. The vent forming element preferably consisting of a foamed resin is provided in conjunction with the monolithic embodiment and utilizes a chimney effect in its operation.

BRIEF DESCRIPTION OF THE DRAWINGS

FIG. 1 is a view in perspective, partially broken away to illustrate the manner in which the pipe insulation is built up;

FIG. 2 is a fragmentary cross-sectional view of the pipe installation shown in FIG. 1;

FIG. 3 is a view in perspective of the duct forming means;

FIG. 4 is a plan view of the improved parting medium which is used to form the plenum chamber about the pipe;

FIG. 5 is an enlarged cross-sectional view of the medium shown in FIG. 4;

FIG. 6 is a cross-sectional view of the completed pipe installation; and

FIG. 7 is a fragmentary cross-sectional view of the outlet end of the installation.

DESCRIPTION OF THE PREFERRED EMBODIMENTS

In FIG. 1, reference numeral 10 indicates generally a poured structural concrete pad which rests upon the bottom of a trench dug for the purpose of accommodating a pipe line. A water impervious membrane 11 composed of polyvinyl chloride or the like and have having a generally U-shaped configuration is disposed over the pad 10, and a water impervious cover 12 overlaps the ends of the membrane 11 and is preferably heat sealed or adhesively secured to the membrane 11 at the areas of overlap. The impervious membranes 11 and 12 are not essential to the practice of the invention and may sometimes be eliminated.

In the embodiment shown in the drawings, there is provided a single fluid carrying pipe 13 although, obviously, any number of pipes can be included in the embedment. The pipe 13 is shown temporarily supported upon spaced support blocks 14 composed of a thermal insulating concrete mixture. In practice, the ends of the pipe will also be fixedly secured to suitable supports, but this structure has not been illustrated since it forms no part of the present invention.

The thermal insulation which provides the embedment for the pipe is generally indicated at reference numeral 16 in the drawings. This embedment may be composed of conventional insulating concrete, or preferably, consists of a mixture of an expanded aggregate such as expanded vermiculite or perlite coated with a thin film of a bituminous material and combined with a water insoluble stearate waterproofing agent, an air entraining agent, and a metal passivator, the foregoing ingredients being combined with Portland cement and water in making up the concrete. The coated aggregate is preferably of the type described in Sucetti U.S. Pat. No. 2,824,022 issued on Feb. 18, 1958. The aggregate particles, as described in the patent, are coated with a continuous, uniformly thin film of water resistant material of a thickness less than about 10 microns, the particles being noncoalescing and having a substantially reduced capillary uptake capacity.

The water insoluble stearate is preferably calcium stearate but may consist of aluminum stearate or zinc stearate. Generally, at least 0.1 pounds of the stearate should be added for every cubic foot of the aggregate. At quantities greater than about 0.5 pounds of stearate, there is little additional benefit to be derived and the cost may become excessive.

The air entraining agent can be any surface active material which is normally used to entrain air in aqueous systems, and I prefer to use a material such as HERCULES NVX because this material provides a particularly strong and permanent bubble structure when present in the wet, insulating concrete mass and also provides some waterproofing effect of its own. HERCULES NVX is a neutralized VINSOL resin, the latter being a mixture of resinous materials recovered as a black residue after the extraction of rosin with petroleum solvents. The preferred range for the air entraining agent is from 0.01 to 0.2 pounds of the agent per cubic foot of micaceous aggregate.

A passivator is added to lower the electromotive force which is inherently present between the metal pipe and its environment, which electromotive force could cause electrolytic corrosion. Sodium nitrite is particularly preferred for this use, but potassium of sodium dichromate can also be substituted but with less effective results. Sodium nitrite should be added in quantities of at least 0.04 pounds per cubic foot of the aggregate. Quantities in excess of about 0.3 pounds per cubic foot are not necessary and become expensive.

The waterproofing premix, containing the stearate, air entraining agent, and passivating agent is added to the coated aggregate particles (usually having a density of 6 to 8 pounds per cubic foot) in a ratio of about 2 pounds of the dry powder to 3 cubic feet of the coated vermiculite aggregate. The resulting mixture is then combined with Portland cement and water in the normal ratios for making lightweight concrete, that is, one bag of Portland cement (94 pounds) to 4 to 10 cubic feet of the premix.

Before the insulating concrete is poured about the periphery of the pipe 13, the parting medium for the formation of the air plenum chamber is first positioned about the periphery of the pipe 13. Specifically, a pad 17 composed of a meltable thermoplastic material, preferably in foam form such as foamed polystyrene, or the like, is positioned above the pipe 13, and wrapped with a meltable thermoplastic film material generally indicated at reference numeral 18 in the drawings. As best seen in FIG. 4 and 5, this material consists of a laminate of two thermoplastic sheets consisting of a base sheet 19 and an outer sheet 21 heat sealed together at spaced areas generally indicated at 22 thereby providing bubbles or pockets 23 in which air is trapped. This material is available commercially in various forms, under the trade name AIR-CAP.

Another improvement of the present invention resides in the manner in which one or more air vents are provided in the embedment. Instead of forming the vents after pouring of the concrete I may use preformed vents disposed, for example, in the corners of the embedment, and consisting of the type of structure shown in FIG. 3 of the drawings. Specifically, the vent forming means may take the form of a generally triangular rigid foam block 26 having an arcuate duct 27 running longitudinally thereof. The block of foam material is wrapped with a vapor permeable, filter media such as coated paper 28 which prevents the concrete from seeping through into the duct. The blocks of foam material are positioned at opposite sides of the trench in spaced relation to the pipe 13, and then the slurry of thermal insulating concrete is poured about the pipe and over the duct formers.

Because of the efficiency of the plenum chamber produced according to the present invention, I can reduce the number of air vent ducts which have heretofore been used. Consequently, the concrete embedment 16 may be formed with chamfered sides 29 and 31 at the upper portions thereof since it is normally not necessary to include vent passages in this area. This results in a saving of concrete without a loss in efficiency.

At the discharge end of the conduit system, as illustrated in FIG. 2 of the drawings, there is provided a sheet metal housing 32 in which there is disposed a nonmeltable barrier material 33, and a block of meltable thermoplastic material 34. The function of the nonmeltable material 33 which may consist of reticulated polyurethane, matted glass fibers, or other material offering a significant resistance to air flow is to avoid a chimney effect by means of which air from the plenum chamber surrounding the pipe would be drawn with substantial mass velocity longitudinally through the installation, and discharged through the outlet conduit 36. Alternatively, the control of air flow through the plenum chamber can be controlled mechanically by providing suitable baffle means within the sheet metal housing 32, or by providing a damper valve in the discharge outlet 36.

After the thermal insulating concrete has been poured and taken an initial set, steam or other high temperature fluid is passed through the pipe 13, whereupon the pad 17, the wrapper 18, and the block 34 all composed of meltable thermoplastic material are melted out cleanly and are absorbed in the surrounding monolithic concrete embedment because of the permeable nature of the concrete. The resulting configuration is shown in FIGS. 6 and 7 of the drawings. The pipe 13 is provided with a spaced plenum chamber 38 which has been formed by the melting of the pad 17 and the wrapper 18. During operation, air at a controlled velocity can be introduced into the plenum chamber 38 by suitable means (not shown) whereupon it is warmed by contact with the hot surface of the pipe 13 since the fluid in the pipe is normally at a temperature above the ambient temperature of the surroundings, and is usually above the boiling point of water. This air, under a slight positive pressure then diffuses radially through the insulation and into the vent passages 27 from which the moisture laden air is removed. The removal of air and water vapor from the vent passages can be increased by thermal siphon effects or by providing a positive displacement means such as a blower in communication with the vent passages.

The pressure differential between the plenum chamber 38 provided about the periphery of the pipe and the vent passages 27 need not be very high, as I have found that a pressure difference as low as one-half inch of water gauge can be employed for practical drying rates. The maximum pressure differential is determined by the fluid flow characteristics of the vent passages. Applied pressures in excess of about 125 pounds per square inch are not practical nor are they necessary to secure the improved results of the invention.

The air flow rate is the most important single factor in securing proper diffusion drying. Actually, with more porous concrete mixes, the air flow rate will be higher. Generally speaking, therefore, an air flow rate of 2 to 25 cubic feet per inch of insulation thickness per minute per inch of water pressure difference per square foot of insulation cross section perpendicular to the direction of air flow will be appropriate.

At the discharge end, the plenum chamber 38 communicates with an annular air space 39 formed by the melting of the thermoplastic material 34. Some air passes through the constriction provided by the barrier material 33 confined in the sheet metal housing 32, and finally passes out of the pipe assembly by means of discharge conduit 36.

I claim:

1. An insulated pipe structure comprising a pipe, a thermal insulating embedment about said pipe with a void space therebetween, said embedment having at least one chamfered corner, and at least one duct forming element abutting said chamfered corner and providing a longitudinally extending vent for the passage of moisture vapor therealong, said duct forming element comprising a triangularly shaped block of a rigid foam having an arcuate duct therealong and a vapor permeable membrane trained about said block.

2. An insulated pipe structure comprising a pipe, a monolithic thermal insulating concrete embedment about said pipe with a void space therebetween, said embedment having chamfered corners, an outlet for said embedment communicating with said void space, means associated with said outlet providing an appreciable resistance to free air passage at said outlet, and at least one duct forming element abutting said chamfered corners and providing a longitudinally extending vent for the passage of moisture vapor therealong.

3. The structure of claim 2 in which said last-named means consists of a porous mass disposed in said outlet means.

4. The structure of claim 2 in which said means associated with said outlet includes a reticulated block of resin.

5. The structure of claim 2 in which said means associated with said outlet includes a mat of glass fibers.

6. The structure of claim 2 in which said duct forming element consists of a piece of rigid foam.